(12) United States Patent
Ng et al.

(10) Patent No.: US 9,582,392 B2
(45) Date of Patent: Feb. 28, 2017

(54) ADD-ON PERFORMANCE ADVISOR

(75) Inventors: Herman H. Ng, Redmond, WA (US); Marc A. Silbey, Redmond, WA (US); Paul L. Cutsinger, Redmond, WA (US); Li-Hsin Huang, Redmond, WA (US); Stephen A. Turton, Redmond, WA (US); Bhargavi Hiremagalur, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 570 days.

(21) Appl. No.: 12/881,948

(22) Filed: Sep. 14, 2010

(65) Prior Publication Data

US 2012/0066666 A1 Mar. 15, 2012

(51) Int. Cl.
*G06F 9/44* (2006.01)
*G06F 11/30* (2006.01)
(Continued)

(52) U.S. Cl.
CPC .......... *G06F 11/302* (2013.01); *G06F 9/4446* (2013.01); *G06F 9/44526* (2013.01); *G06F 11/3051* (2013.01); *G06F 11/34* (2013.01)

(58) Field of Classification Search
None
See application file for complete search history.

(56) References Cited

U.S. PATENT DOCUMENTS 6,674,450 B1 * 1/2004 Toub et al. ............... 715/749
6,683,629 B1   1/2004 Friskel et al.
(Continued)

FOREIGN PATENT DOCUMENTS

CN   101194247        6/2008
JP   2009-294716   * 12/2009  .............. B41J 29/38
(Continued)

OTHER PUBLICATIONS

"Firefox hangs", Retrieved from: <http://kb.mozillazine.org/Firefox_hangs> on Dec. 17, 2010, (Dec. 6, 2010), 7 pages.
(Continued)

*Primary Examiner* — Lewis A Bullock, Jr.
*Assistant Examiner* — Tina Huynh
(74) *Attorney, Agent, or Firm* — Bryan Webster; Dan Choi; Micky Minhas (57) ABSTRACT

Various embodiments provide an add-on advisor that is designed to assist users in managing add-ons for a browser and/or other application programs. In at least some embodiments, the add-on advisor can be implemented to detect newly installed add-ons and provide notifications to a user of the detected add-ons. The notifications regarding new add-ons can be configured with options to permit the user to enable or disable the add-ons. Add-ons that are not explicitly enabled by a user can be prevented from operating by the add-on advisor. Further, in at least some embodiments, the add-on advisor can be implemented to monitor performance impact of add-ons and provide notifications to a user when add-ons adversely affect performance. The user can then interact with the add-on advisor to improve performance by selectively enabling and disabling add-ons.

20 Claims, 7 Drawing Sheets

(51) Int. Cl.
G06F 9/445 (2006.01)
G06F 11/34 (2006.01)

(56) References Cited

U.S. PATENT DOCUMENTS

| | | | |
|---|---|---|---|
| 7,865,594 B1* | 1/2011 | Baumback et al. | 709/224 |
| 9,009,834 B1* | 4/2015 | Ren | G06F 21/10 709/224 |
| 2003/0079160 A1* | 4/2003 | McGee et al. | 714/39 |
| 2003/0112269 A1* | 6/2003 | Lentz | G06F 3/04847 715/738 |
| 2005/0060663 A1* | 3/2005 | Arkeketa et al. | 715/810 |
| 2005/0229104 A1* | 10/2005 | Franco et al. | 715/743 |
| 2006/0282899 A1* | 12/2006 | Raciborski | 726/26 |
| 2007/0016532 A1 | 1/2007 | Zhang | |
| 2007/0044085 A1* | 2/2007 | Stamper et al. | 717/168 |
| 2007/0116089 A1* | 5/2007 | Bisch et al. | 374/208 |
| 2007/0174424 A1* | 7/2007 | Chen et al. | 709/217 |
| 2008/0031595 A1* | 2/2008 | Cho | 386/108 |
| 2008/0148039 A1* | 6/2008 | Cobb et al. | 713/100 |
| 2008/0301562 A1* | 12/2008 | Berger et al. | 715/733 |
| 2009/0282423 A1* | 11/2009 | Smith et al. | 719/328 |
| 2009/0320051 A1 | 12/2009 | Meerwald et al. | |
| 2010/0082695 A1* | 4/2010 | Hardt | 707/798 |
| 2010/0198838 A1 | 8/2010 | Stamper et al. | |
| 2010/0293226 A1* | 11/2010 | Beck et al. | 709/204 |
| 2011/0173534 A1* | 7/2011 | Huang et al. | 715/702 |

FOREIGN PATENT DOCUMENTS

| | | |
|---|---|---|
| JP | 2009294716 | 12/2009 |
| TW | 200928980 | 7/2009 |
| WO | WO-2012036709 | 3/2012 |

OTHER PUBLICATIONS

"How to Improve Extension Startup Performance", Retrieved from: <http://blog.mozilla.com/addons/2010/06/14/improve-extension-startup-performance/> on Dec. 17, 2010, (Jun. 14, 2010), 8 pages.

Dsouza, Keith "Google Chrome Extensions vs Firefox Add-ons: Head to Head Comparison", Retrieved from: <http://techie-buzz.com/featured/google-chrome-extensions-vs-firefox-addons.html> on Dec. 17, 2010, (Dec. 13, 2009), 16 pages.

Ng, Herman "Add-on Performance Part 3: Optimizing Add-on Startup Performance", Retrieved from: <http://blogs.msdn.com/b/ie/archive/2010/10/07/add-on-performace-part-3-optimizing-add-on-startup-performance.aspx> on Dec. 17, 2010, (Oct. 7, 2010), 12 pages.

Ng, Herman "Add-ons: Staying in Control of Your Browsing Experience", Retrieved from: <http://blogs.msdn.com/b/ie/archive/2010/09/17/add-ons-staying-in-control-of-your-browsing-experience.aspx> on Dec. 17, 2010, (Sep. 17, 2010), 35 pages.

Ng, Herman "Tuning Add-on Performance: Windows Live Messenger Companion", Retrieved from: <http://blogs.msdn.com/b/ie/archive/2010/11/05/tuning-add-on-performance-windows-live-messenger-companion.aspx> on Dec. 17, 2010, (Nov. 5, 2010), 7 pages.

Norman, George "Crankshaft Improves Chrome's Peak Performance Twofold", Retrieved from: <http://www.findmysoft.com/news/Crankshaft-Improves-Chrome-s-Peak-Performance-Twofold/> on Dec. 17, 2010, (Dec. 10, 2010), 3 pages.

"International Search Report and Written Opinion", PCT Application No. PCT/US2010/059999, (Sep. 1, 2011), 8 pages.

"Foreign Office Action", JP Application No. JP2009294716, May 29, 2014, 8 Pages.

"Search Report", TW Application No. 99145834, Mar. 20, 2015, 2 Pages.

"Foreign Office Action", JP Application No. 2013-529118, Dec. 25, 2014, 4 pages.

"Speeding up startup time in OS", vol. 16, No. 7 of PC fan published on Jun. 1, 2009 by Mainichi Communications, Jun. 1, 2009, 4 Pages.

Fukuda,"Setting up your application environment", vol. 7, No. 3 of NikkeiLinux published on Mar. 8, 2005 by Nikkei BP, Mar. 8, 2005, 12 Pages.

Shibata,"Web browser competition", printed in vol. 14, No. 4 of Mac People, Apr. 1, 2008, 11 Pages.

Takizawa,"Internet Explorer 7 Introduction", No. 532 of Nikkei Personal Computer published on Jun. 25, 2007 by Nikkei BP, Jun. 25, 2007, 6 Pages.

"Search Report", TW Application No. 099145834, Mar. 20, 2015, 1 page.

"Written Opinion", PCT Application No. 2010-059999, Sep. 1, 2011, 3 pages.

"Foreign Notice of Allowance", JP Application No. 2013-529118, Jun. 29, 2015, 4 pages.

"Foreign Office Action", CN Application No. 201110288902.6, Dec. 23, 2015, 11 pages.

"Foreign Office Action", CN Application No. 201110288902.6, Oct. 10, 2016, 12 pages.

"Foreign Office Action", KR Application No. 10-2013-7006555, Aug. 11, 2016, 15 pages.

* cited by examiner

ADD-ON PERFORMANCE ADVISOR

BACKGROUND

Add-ons are popular with users because add-ons are a convenient way to add new and customized functionality to a browser or other application program. Unfortunately, users may not be aware that certain add-ons have been installed and/or may not appreciate that add-ons can adversely affect performance due to the time it takes add-ons to load and operate. Accordingly, users may misattribute poor performance that is caused by add-ons to the browser or other application program. Moreover, a traditional approach to management of add-ons is limited to turning add-ons on or off collectively. While this approach gives the user some control over add-ons, the user may be forced to disable some add-ons the user likes due to poor performance caused by other add-ons.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide an add-on advisor that is designed to assist users in managing add-ons for a browser and/or other application programs. In at least some embodiments, the add-on advisor can be implemented to detect newly installed add-ons and provide notifications to a user of the detected add-ons. The notifications regarding new add-ons can be configured with options to permit the user to enable or disable the add-ons. Add-ons that are not explicitly enabled by a user can be prevented from operating by the add-on advisor. Further, in at least some embodiments, the add-on advisor can be implemented to monitor performance impact of add-ons and provide notifications to a user when add-ons adversely affect performance. The user can then interact with the add-on advisor to improve performance by selectively enabling and disabling add-ons.

BRIEF DESCRIPTION OF THE DRAWINGS

The same numbers are used throughout the drawings to reference like features.

DETAILED DESCRIPTION

Overview

Various embodiments provide an add-on advisor that is designed to assist users in managing add-ons for a browser and/or other application programs. In at least some embodiments, the add-on advisor can be implemented to detect newly installed add-ons and provide notifications to a user of the detected add-ons. The notifications regarding new add-ons can be configured with options to permit the user to enable or disable the add-ons. Add-ons that are not explicitly enabled by a user can be prevented from operating by the add-on advisor. Further, in at least some embodiments, the add-on advisor can be implemented to monitor performance impact of add-ons and provide notifications to a user when add-ons adversely affect performance. The user can then interact with the add-on advisor to improve performance by selectively enabling and disabling add-ons.

In the discussion that follows, a section entitled "Operating Environment" is provided and describes one environment in which one or more embodiments can be employed. Following this, a section entitled "Example User Interface with Notification Bar" describes an example user interface for an application configured to use a notification bar for add-on notifications in accordance with one or more embodiments. Next, a section entitled "Example Add-On Advisor Features" describes example techniques and features of an add-on advisor in accordance with one or more embodiments. This section includes multiple subsections that describe various features in accordance with one or more embodiments. Last, a section entitled "Example System" describes an example system that can be utilized to implement one or more embodiments.

Operating Environment

Figure 1:
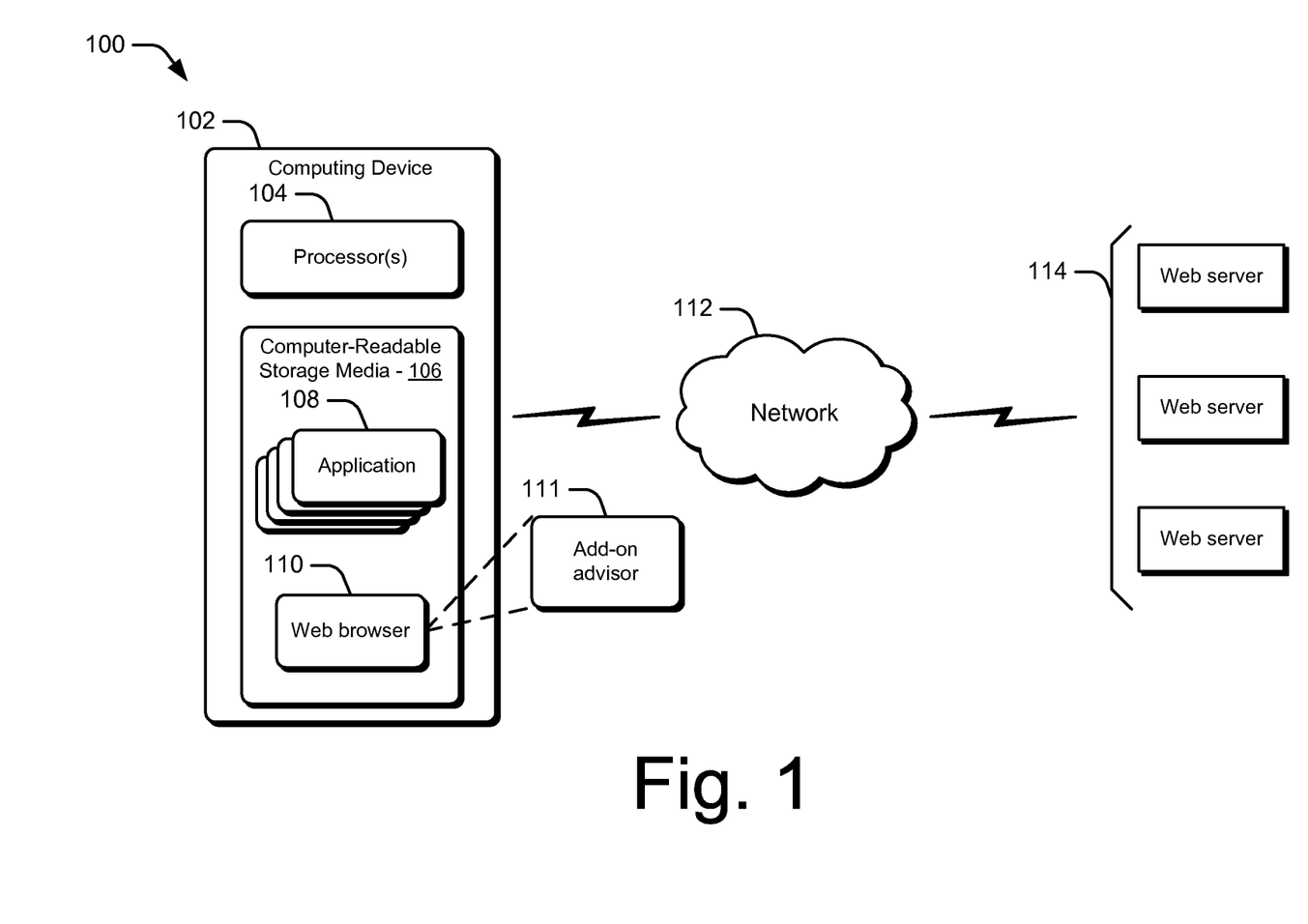
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 7.

In addition, computing device 102 includes a software application in the form of a web browser 110 that includes or otherwise makes use of an add-on advisor 111 that operates as described above and below. The add-on advisor provides add-on management designed to keep users in control of their add-ons. In at least some embodiments, the add-on advisor can detect newly installed add-ons and notify a user to provide the user with options to enable installed add-ons. The add-on advisor can prevent or restrict operation of add-ons that are not explicitly enabled by a user. Further, in at least some embodiments, the add-on advisor can monitor add-on performance and prompt a user when performance impact exceeds a configurable performance threshold. The user can then interact with the add-on advisor to selectively enable or disable add-ons, as will become apparent below.

While various examples of add-on management are described herein in the context of a browsing environment and a web browser, it is to be appreciated that the add-on advisor 111 and corresponding techniques can be employed in a variety of environments and with any suitable applications that make use of add-ons. By way of example, the add-on advisor can be implemented to manage add-ons for one or more of a web browser as in the described examples, email applications, desktop productivity applications, game applications, media applications, and/or other suitable applications of a computing device 102.

In addition, environment 100 includes a network 112, such as the Internet, and one or more web servers 114 from and to which content can be received and sent, as described above and below. Such content can include web pages that are received from the web servers.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of some example embodiments that can utilize the add-on advisor 111.

Example User Interface with Notification Bar

Figure 2:
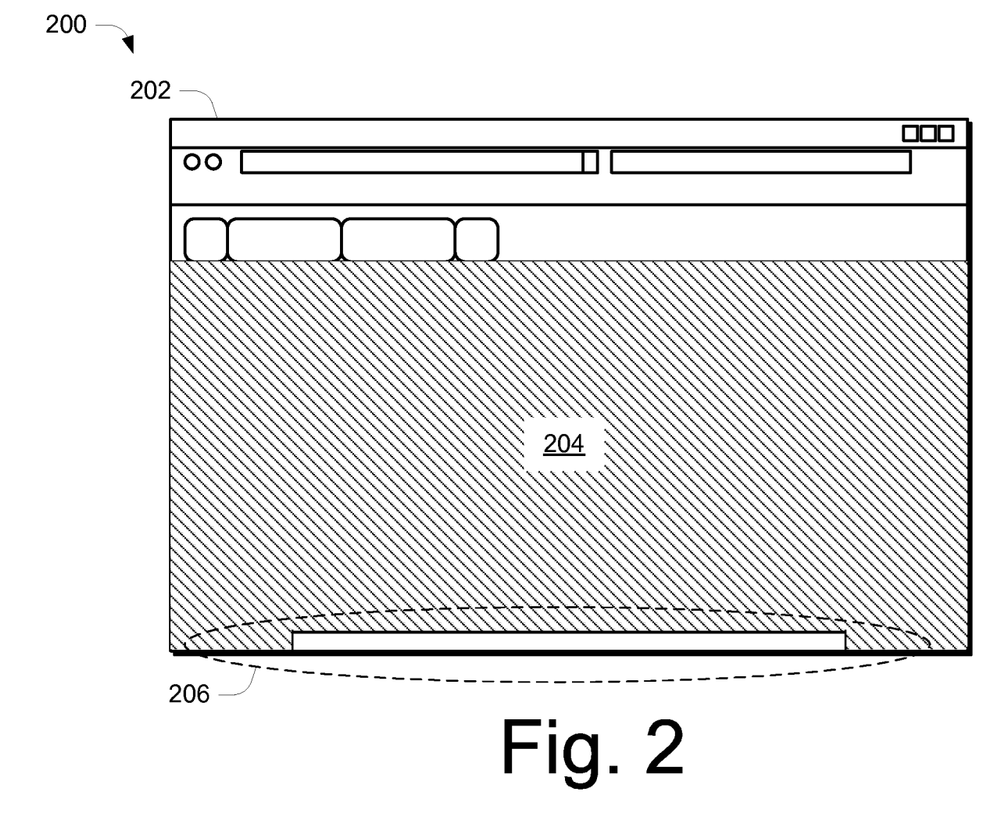
FIG. 2 illustrates an example web browser in accordance with one or more embodiments.

FIG. 2 illustrates an example web browser, in accordance with one or more embodiments, generally at 200. The depicted web browser is but one example of an application that can make use of add-ons and an add-on advisor 111 to facilitate management of the add-ons. Web browser 200 includes a web browser user interface 202 which includes typical instrumentalities such as back and forward navigation buttons, an address bar, a search bar, and a tab band that can support multiple tabs, all of which are undesignated. The web browser user interface also includes a content rendering area 204 (designated by the cross hatching) in which content can be rendered. In addition, web browser user interface 202 includes a notification bar 206. In one or more embodiments, the notification bar is designed to help users maintain focus on their browsing activities, while offering notifications in the form of suggestions. Notifications presented via the notification bar can include notifications related to add-ons that are output or otherwise caused via operation of the add-on advisor 111 to enable various techniques for add-on management.

In at least some embodiments, the notification bar is non-modal and is presented at a location within the browsing field-of-view that is selected to reduce user distraction. For example, in the illustrated and described embodiment, the notification bar is presented at or near the bottom of the web browser's user interface—here adjacent the bottom of or below content rendering area 204. The notification bar is designed to be noticeable yet ignorable, thus enabling a user to continue with their browsing tasks in content rendering area 204, without being distracted by a modal dialog. Further, in at least some embodiments, the notification bar is presented in a manner which overlays content that is rendered by the web browser. The notification bar's location effectively prioritizes content that is rendered within content rendering area 204 over a particular notification that might appear in the notification bar.

Having considered an example user interface that makes use of a notification bar in accordance with one or more embodiments, consider now some details regarding example add-on advisor features that can be provided in accordance with one or more embodiments.

Example Add-on Advisor Features

Add-on Notifications

Figure 3:
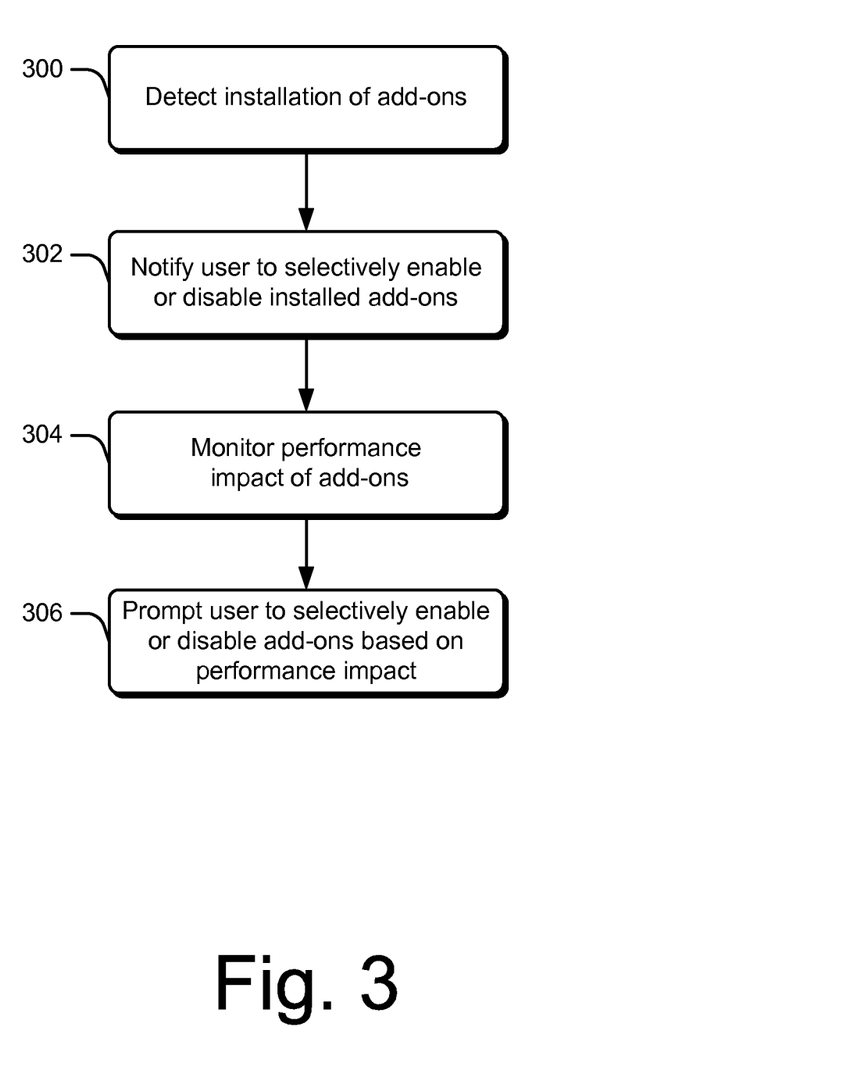
FIG. 3 is a flow diagram that describes steps of a method in accordance with one or more embodiments.
Figure 4A:
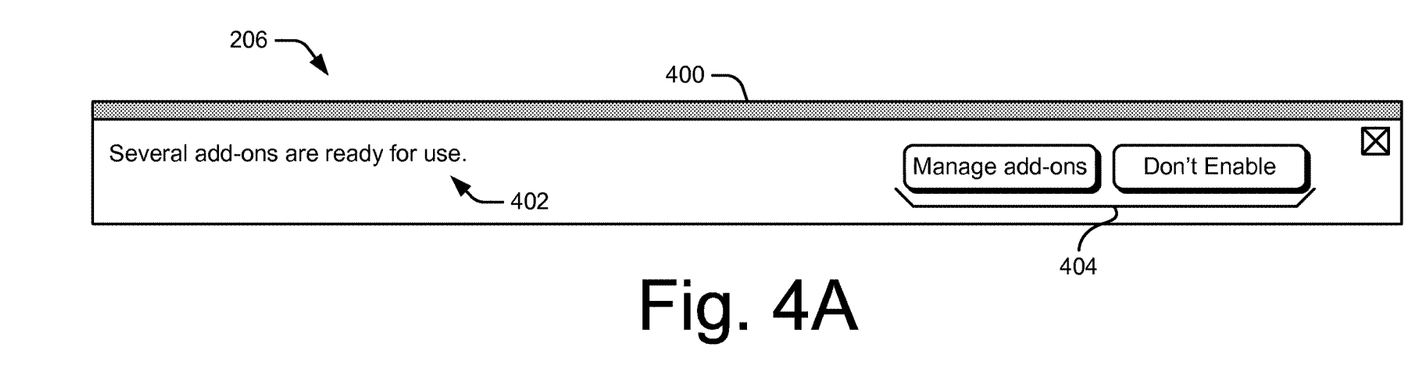
FIGS. 4A and 4B illustrate example notifications related to add-ons in accordance with one or more embodiments.
Figure 4B:
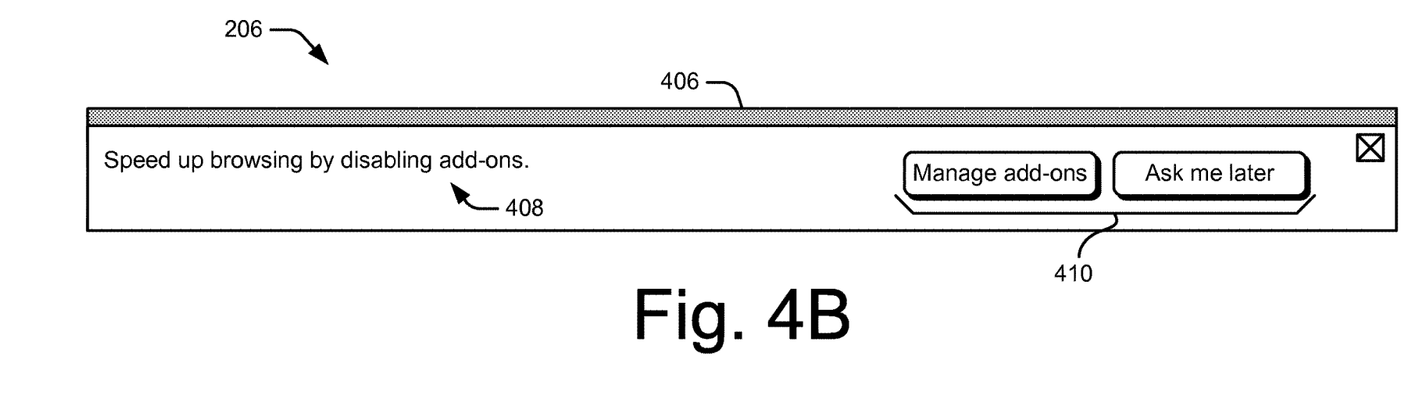

FIG. 3 is a flow diagram that describes steps of a method in accordance with one or more embodiments. The method can be implemented in connection with any suitable hardware, software, firmware, or combination thereof. In at least some embodiments, the method can be implemented by way of a suitability configured computing device, such as the example computing device 102 of FIG. 1 that includes or otherwise makes use of a add-on advisor 111. In the discussion of FIG. 3, reference will be made to example notifications that are depicted in FIGS. 4A and 4B.

Step 300 detects installation of add-ons. For example, add-ons can be installed directly by a user, as part of installation of another application program, and/or by a background process. Thus, a user may or may not know when add-ons are installed. To facilitate user control of add-ons, add-on advisor 111 can be configured to initially disable add-ons when they are first installed. An add-on can remain disabled until a user provides explicit selection to enable the add-on. In this manner, execution of add-ons that a user has not selected can be prevented or otherwise restricted.

Add-ons can be enabled/disabled in any suitable way. One way this can occur is through one or more configurable flags or fields that are associated with add-ons when they are installed. The configurable flags or fields can be set to indicate when an add-on is new and also whether the add-on is enabled or disabled. A new add-on in this context refers to an add-on for which a user has yet to take action on to enable or disable the add-on. Accordingly, the add-on advisor can reference the flags, fields, and/or other suitable indicators to detect newly installed add-ons that have not been acted upon by a user.

Step 302 notifies a user to selectively enable or disable installed add-ons. This step can occur responsive to the detection of one or more newly installed add-ons. The notification can be configured to inform the user of the newly installed add-ons and provide options selectable to permit the user to choose add-ons to enable or disable by setting the configurable flags or fields. Options to permit the user to choose add-ons to enable or disable can be provided directly through the notification and/or through a separate dialog or interface that is made accessible through the notification. Add-ons that are enabled by setting the configurable flags or fields can be permitted to operate. On the other hand, operation of add-ons that are disabled through the configurable flags or fields can be restricted.

Any suitable notification can be presented to notify a user regarding add-ons that have been installed and are ready for use. Suitable notifications can include a pop-up dialog box, an html page rendered by a web browser or other application, a tab alert of a tabbed user interface, a notification bar notice as discussed in relation to FIG. 2, and/or combinations thereof. In at least some embodiments, the notification can be output automatically, if appropriate, upon the occurrence of particular events such as when an application (e.g., browser) is opened, a new add-on is installed by an application, the application is closed, and so forth.

By way of example, FIG. 4A depicts an example notification for newly installed add-ons that is configured for presentation via the notification bar 206 of FIG. 2. In this example, a notification 400 includes informational text 402 that indicates "Several add-ons are ready for use." Optionally, informational text 402 can include details regarding the various add-ons such as names, publisher, status, performance statistics, and so forth. The notification 400 can also include one or more user-selectable instrumentalities such as the illustrated buttons shown generally at 404 that are configured to provide various options for management of add-ons. For instance, the example buttons of FIG. 4A include a "Manage add-ons" button that when selected can be configured to expose another dialog or interface through which the user can obtain more detailed information regarding add-ons, choose add-ons to enable and disable, and/or perform other actions to manage add-ons. The other dialog or interface can be configured to provide details regarding the various add-ons mentioned above, in addition to or in lieu of providing such details as part of informational text 402. An example add-on dialog to facilitate various add-on management techniques is discussed in detail herein in a section below entitled "Add-On Management." The example buttons of FIG. 4A further include a "Don't Enable" button that can be selected to keep the new add-ons disabled directly through the notification 400.

Step 304 monitors performance impact of add-ons. For example, the add-on advisor can operate to monitor the impact of add-ons using various performance metrics. Examples of suitable performance metrics include, but are not limited to, add-on load times, page navigation time, document rendering time, memory usage, and CPU usage, to name a few. By monitoring these and/or other suitable metrics, the add-on advisor can ascertain when an add-on or multiple add-ons in combination create performance issues. Further details regarding such monitoring can be found in a section below entitled "Add-On Performance Monitoring."

When a performance issue is ascertained through the monitoring performed in step 304, a notification can be output to inform the user and prompt the user to take action. In particular, step 306 prompts a user to selectively enable or disable add-ons based on the performance impact. Any suitable notification can be presented to notify a user regarding add-on performance, including at least the example kinds of notifications discussed above with respect to detection of newly installed add-ons. In at least some embodiments, the notification can be output automatically when a performance threshold related to one or more performance metrics is exceeded.

By way of example, FIG. 4B depicts an example notification for add-on performance that is configured for presentation via the notification bar 206 of FIG. 2. In the depicted example, the notification relates to a browsing context. In this context, the add-on advisor can cause the notification to be automatically presented when performance monitoring indicates that page load times and/or navigation times have exceeded a threshold value set for browsing delay due to operation of one or more add-ons. Accordingly, the notification can be configured to provide the user with available options to speed-up browsing.

In particular, the example notification 406 includes informational text 408 that prompts the user to "Speed up browsing by disabling add-ons." The notification 406 also includes example buttons shown generally at 410 that are configured to provide various options for management of add-ons in response to the notification. For instance, the example buttons of FIG. 4B include a "Manage add-ons" button comparable to one discussed in relation to FIG. 4A. The "Manage add-ons" button can be selected to expose another dialog or interface through which the user can obtain more detailed information regarding add-ons, choose from among various add-ons to enable and disable, and otherwise manage add-ons. The example buttons of FIG. 4B also include an "Ask Me Later" button that can be selected to cause the add-on advisor to notify the user again at some future time.

Having described example add-on notifications that can be utilized in accordance with one or more embodiments, consider now example add-on performance monitoring techniques in accordance with one or more embodiments.

Add-on Performance Monitoring

Recall from the preceding discussion that add-on advisor 111 can be configured to perform various monitoring of add-ons to facilitate add-on management. As noted, performance monitoring can be employed to provide feedback to users regarding the performance of add-ons. In particular, monitoring of performance metrics can trigger notifications to provide user with control over add-ons and offer options to manage the add-ons. Notifications that are output responsive to monitoring of various performance metrics can provide access to tools, interfaces, and instrumentalities to facilitate management of add-ons based on performance of the add-ons.

In a browsing context, examples of suitable performance metrics that can be monitored by the add-on advisor include, but are not limited to, add-on load times, page navigation time, memory usage, and CPU usage, to name a few. Add-on load times can be ascertained when a browser is initially opened or otherwise when add-ons are loaded. Page navigation time can be computed when navigation events occur, such as when a link is selected, a new tab is opened, and/or other navigation events occur. Memory usage and/or CPU usage can be determined during operation of add-ons to perform the tasks they are configured to perform. Naturally, other metrics can be monitored in other contexts in which the add-on advisor can be employed for add-on management. For instance, an add-on advisor can be implemented to monitor email send/receive times for an email application, content download times for a media application, document rendering times for a word processor, and game load times for a gaming application, to name a few other examples.

Figure 5:
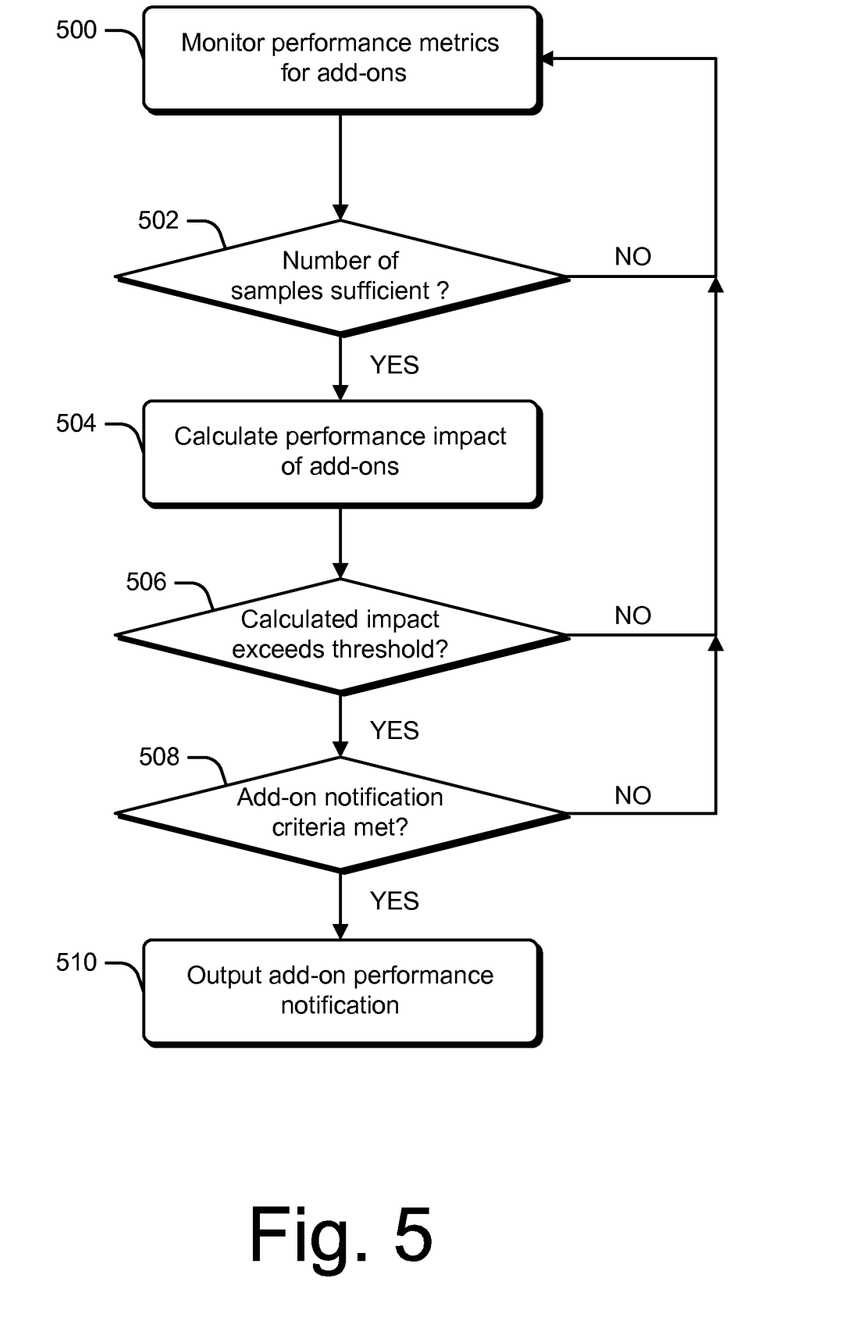
FIG. 5 is a flow diagram that describes steps of a method in accordance with one or more embodiments.

By way of example, consider FIG. 5, which is a flow diagram that describes steps of a method for monitoring add-on performance in accordance with one or more embodiments. The method can be implemented in connection with any suitable hardware, software, firmware, or combination thereof. In at least some embodiments, the method can be implemented by way of a suitability configured computing device, such as the example computing device 102 of FIG. 1 that includes or otherwise makes use of an add-on advisor 111.

Step 500 monitors performance metrics for add-ons. The monitoring can occur for various metrics as discussed above and/or in various different contexts. It is further contemplated that the add-on advisor can be configured to perform various techniques to facilitate add-on management as described herein, including performance monitoring, for multiple different applications of a computing device.

Step 502 determines whether a number of samples are sufficient. For instance, monitoring and data collection can be performed until a defined number of data samples have been obtained. A configurable value for a number of samples to collect for the monitoring can optionally be set to control the quantity and quality of data used for analysis. Using too few data points for a particular add-on could give inaccurate or unpredictable results. Accordingly, a check can be made to ensure that at least a defined number of samples (e.g., five samples, ten samples, etc.) have been obtained for the purpose of analyzing add-on performance.

When sufficient data is collected, step 504 calculates performance impact of add-ons. One way this can occur by computing averages for the samples collected through the monitoring. Statistical techniques can also be utilized to discard outlying or erroneous data points. In the example of a web browser, one or more add-ons can be monitored to ascertain a performance impact on browsing. More particularly, monitoring of browser add-ons can involve monitoring of one or more targeted performance metrics related to browsing, such as load times and navigation times. A number of samples can be collected for the targeted metrics as noted above. When sufficient data has been collected, performance impact on browsing (e.g., browsing delay) can be computed based on the metrics. For example, total load times and navigation times associated with add-ons (e.g., total impact) and/or individual times for each add-on (e.g., individual impact) can be computed. Other metrics as discussed previously can also be employed.

Step 506 ascertains whether the calculated impact exceeds a performance threshold. For instance, based on various metrics, an assessment can be made regarding whether the performance impact computed in step 504 is at an acceptable or unacceptable level. Add-on notifications and/or management options described herein can be triggered accordingly.

By way of example, a configurable threshold can be associated with load times, navigation times, and/or other performance metrics. Accordingly, add-on advisor can operate to compare performance metrics to corresponding thresholds and take action when the thresholds are exceeded. If, for example, a browser delay threshold is set to 0.2 seconds, add-on advisor can be configured to compute load/navigation times associated with add-ons and output appropriate add-on notifications when the 0.2 second threshold is exceeded by add-ons as a whole and/or by individual add-ons. When performance impact does not exceed the threshold (e.g., performance impact is acceptable), monitoring of performance metrics can continue as per step 500.

When one or more performance thresholds are exceeded, step 508 checks whether additional criteria for add-on notifications are met. If one or more criteria are not met, notifications regarding add-ons may be suppressed (e.g., not displayed). It is contemplated that various additional criteria can be defined to control when add-on notifications are provided to a user. For instance, a user may be able to set preferences to disable add-on notifications or suppress the notifications for a selected time period. In this case, add-on notification can be suppressed accordingly. In another example, notifications can be suppressed if the user has recently dismissed another add-on notification within a designated time period, such as within the last hour or on the same day. Accordingly, add-on advisor can check to make sure any additional criteria defined for add-on notifications are met before causing the notifications to be presented to the user.

When a notification is appropriate, step 510 outputs an ad-on performance notification. For instance, add-on advisor 111 can cause a notification comparable to the examples depicted in FIGS. 4A and 4B to be output, when a performance threshold is exceeded and any other criteria defined to control notifications have been met. A user can then interact with the notification and choose to take various actions that are made available through the notification to manage add-ons, further details of which can be found in the following section.

Having described various embodiments associated with add-on performance monitoring, consider now example add-on management techniques in accordance with one or more embodiments.

Add-on Management

Figure 6:
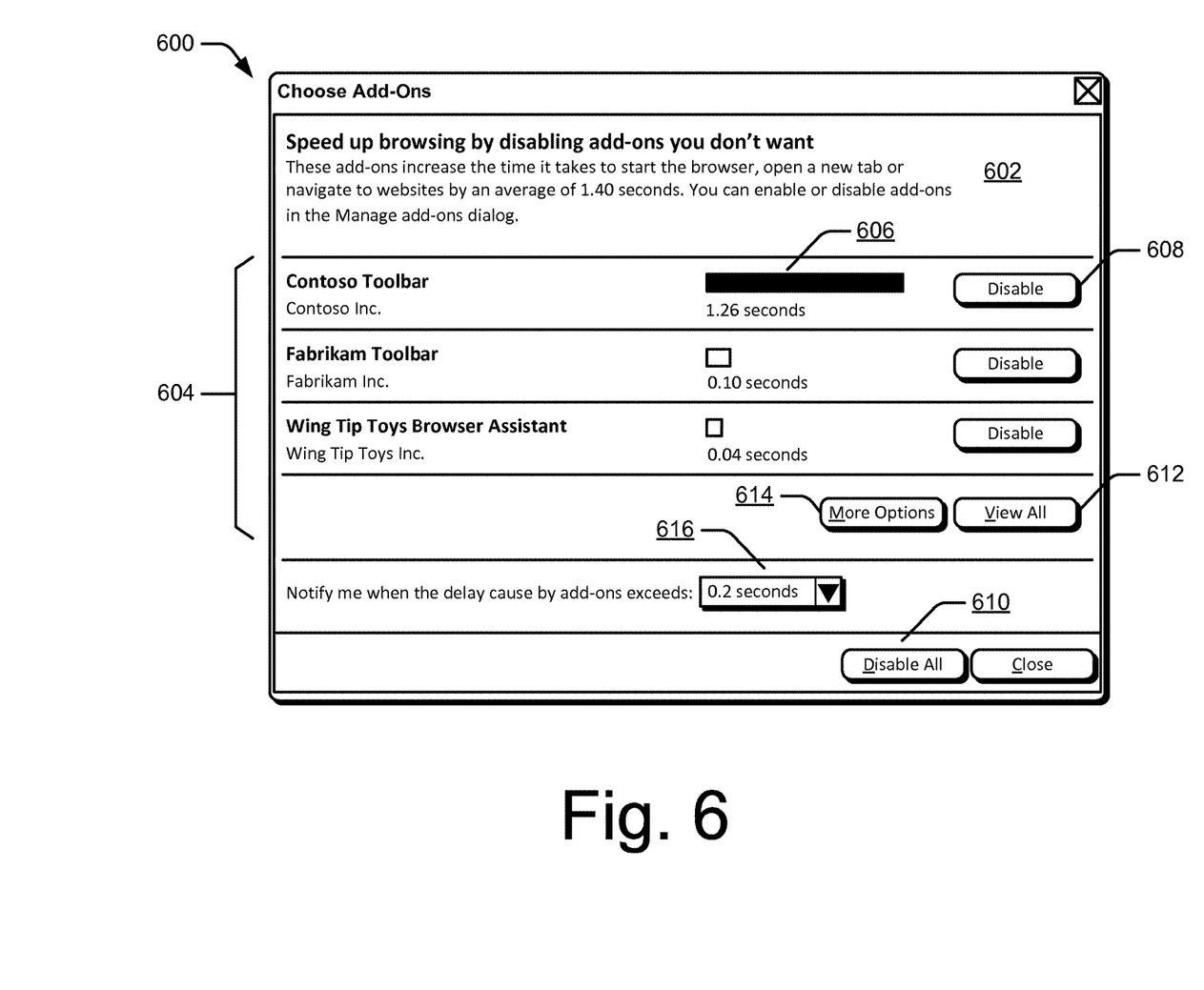
FIG. 6 illustrates an example dialog for an add-on advisor in accordance with one or more embodiments.

Consider now various example add-on management techniques in accordance with one or more embodiments that are discussed in relation to an example dialog for an add-on advisor that is illustrated in FIG. 6. In particular, FIG. 6 depicts generally at 600 an example add-on dialog that can be employed to facilitate management of add-ons. The depicted add-on dialog can be exposed through notifications such as the examples discussed in relation to FIGS. 4A and 4B. In particular, the add-on dialog can be presented responsive to selection of a "Manage Add-ons" button or other instrumentality that is provided with a notification. A user can also access the dialog through a menu item selection, a keyboard short-cut, and so forth. A variety of different options for management of add-ons can be provided by the add-on advisor through one or more dialogs comparable to the example dialog of FIG. 6.

For instance, the example add-on dialog includes a header message 602, an add-on list 604, and various user selectable instrumentalities configured for add-on management. The header message 602 notifies the user as to the performance impact of add-ons and indicates that the user can control add-ons by enabling or disabling the add-ons. The header message 602 in the example also indicates that the performance impact of the add-ons increases browsing times by "1.40 seconds." This performance impact can be determined through performance monitoring as described above and below.

The add-on list 604 can be configured to provide a list of add-ons that can be managed through the dialog and information for the individual add-ons, such as add-on name, creator/publisher, and metrics computed for the add-on (e.g., load times, navigation times, CPU usage, and so on). The add-on list 604 can also be configured to represent the performance impact of add-ons in a relative fashion one to another. In the depicted example, bars 606 having different lengths are used to represent the relative increase in browsing time that is due to each of the add-ons. Visual indicators can also be used to show which of the individual add-ons exceed the threshold and/or cause the total performance impact to exceed the threshold. Visual indicators can include any combination of different colors, text properties, highlighting, animations, icons, and/or other indicators.

Optionally, add-ons in the list can be arranged in order according to the relative impact. In this manner, visual indicators can be used to distinguish add-ons that cause the performance impact to exceed the performance threshold (collectively or individually) from add-ons that do not cause the performance impact to exceed the performance threshold. Accordingly, a user can quickly scan the list to determine which add-ons create the greatest impact on performance.

For example, the bar for the Contoso Toolbar in FIG. 6 is shown in a different color relative to the other bars to indicate that the associated value of 1.26 seconds exceeds the threshold that is set at 0.2 seconds. The values of 0.10 and 0.04 associated with Fabrikam and Wing Tip Toys respectively do not exceed the 0.2 second threshold and thus the corresponding bars appear in a color designated for add-ons that fall under the threshold. Notice that the example add-ons in the list are also arranged from top to bottom in descending order according to their relative impact on performance.

The add-on dialog can be further configured with functionality to allow a user to disable and/or enable various add-ons. This can be accomplished using any suitable user selectable instrumentalities. In the example add-on dialog of FIG. 6, a disable button 608 appears with each item listed in the add-on list. The disable buttons are selectable to disable a corresponding add-on. In addition, a disable all button 610 can be provided that is selectable to disable the add-ons collectively.

In at least some embodiments, add-ons can be assigned to groups and the user can be provided with options to selectively enable/disable add-ons group by group. Add-ons can be grouped in various ways. For instance, groups of add-ons can be formed based on one or more of the type of add-on, functional similarities, creators or providers of the add-on, and/or add-on categories. Add-ons can also be placed in groups based upon whether binaries associated with the add-ons are installed into the same directory. Thus, different group of add-ons can be presented to the user along with options to enable/disable the different groups.

It is noted that an add-on dialog can be configured to show just enabled add-ons as illustrated, all installed add-ons including those that are enabled and disabled, just disabled add-ons, newly installed add-ons, and so forth. The user also can be provided with options to selectively show or hide different kinds of add-ons via the dialog at different times. For instance, an example view all button 612 is shown in FIG. 6 that represents functionality operable to expose a full list of installed add-ons. Options to filter the full list in various ways can appear when the full list is presented. For add-ons shown in an add-on dialog that are disabled, an enable control can be provided that is selectable to enable a corresponding add-on. Likewise, newly installed add-ons can appear in the list with buttons or other controls selectable to enable/disable corresponding add-ons. Thus, a dialog comparable to the example dialog can be configured to facilitate management of newly detected add-ons. For instance, a dialog listing newly detected add-ons can be accessed through a new add-on notification, such as the example discussed in relation to FIG. 4A.

Also depicted in FIG. 6 is an example more options button 614 that represents functionality operable to access various additional options that can be made available via the add-on advisor to facilitate add-on management. Such additional options can include, but are not limited to, links to obtain more information regarding add-ons, category and/or filter tools for add-ons and lists, and/or analysis tools to provide detailed and/or historic performance data associated with add-ons, to name a few examples.

Recall that add-on notifications and management can be triggered based upon thresholds that are associated with various performance metrics. The example add-on dialog can also provide options to view and/or configure the thresholds for various performance metrics. For instance, an example threshold control 616 in FIG. 6 shows a current value of 0.2 seconds that is set for browsing delays. The threshold control 616 is selectable to enable a user to change the value associated with the corresponding threshold. In the depicted example, the threshold control 616 is illustrated as an input list box that when selected can provide a scrollable list of selectable values for the threshold. Although an input list box is depicted in the example, threshold control 616 can be implemented via any suitable instrumentality that enables values for thresholds to be selected. The add-on dialog can include one or more threshold controls comparable to the example threshold control 616 to facilitate threshold management for one or more corresponding performance metrics.

Having considered various example features of an add-on advisor, consider now an example system that can be employed to implement various techniques for add-on management in accordance with one or more embodiments.

Example System

Figure 7:
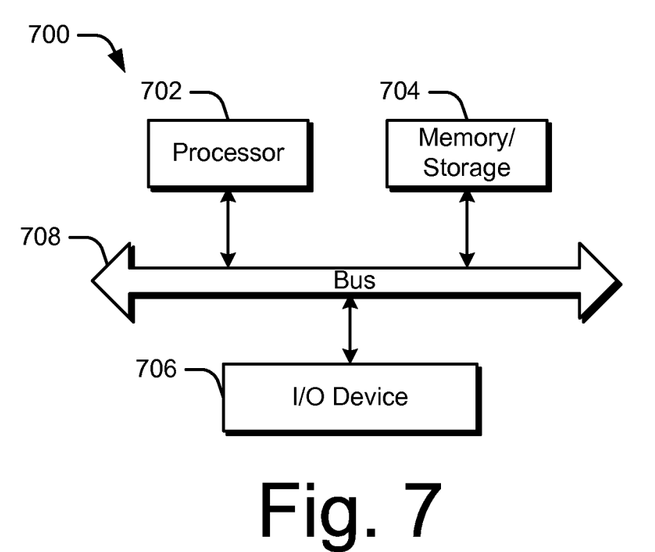
FIG. 7 illustrates an example system that can be used to implement one or more embodiments.

FIG. 7 illustrates an example computing device 700 that can be used to implement the various embodiments described above. Computing device 700 can be, for example, computing device 102 or web server 114 of FIG. 1.

Computing device 700 includes one or more processors or processing units 702, one or more memory and/or storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 can include wired and/or wireless buses.

Memory/storage component 704 represents one or more computer storage media. Component 704 can include volatile media (such as random access memory (RAM)) and/or nonvolatile media (such as read only memory (ROM), Flash memory, optical disks, magnetic disks, and so forth). Component 704 can include fixed media (e.g., RAM, ROM, a fixed hard drive, etc.) as well as removable media (e.g., a Flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide an add-on advisor that is designed to assist users in managing add-ons for a browser and/or other application programs. In at least some embodiments, the add-on advisor can be implemented to detect newly installed add-ons and provide notifications to a user of the detected add-ons. The notifications regarding new add-ons can be configured with options to permit the user to enable or disable the add-ons. Add-ons that are not explicitly enabled by a user can be prevented from operating by the add-on advisor. Further, in at least some embodiments, the add-on advisor can be implemented to monitor performance impact of add-ons and provide notifications to a user when add-ons adversely affect performance. The user can then interact with the add-on advisor to improve performance by selectively enabling and disabling add-ons.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more processors; and
one or more computer readable storage memories storing instructions, that when executed by the one or more processors, cause the one or more processors to implement an add-on advisor configured to perform acts comprising:
monitoring an impact on browsing performance of multiple add-ons installed in connection with a web browser at a computing device;
detecting when the impact on browsing performance of the add-ons collectively exceeds one or more performance thresholds associated with loading a web page in the web browser and defined for the add-ons; and
outputting a notification to inform a user of the detected add-ons and provide the user with access to options to selectively enable or disable the detected add-ons, wherein the notification includes a user selectable instrumentality that is selectable to expose an add-on management dialog configured to represent relative impact on performance of the multiple add-ons one to another and to represent a relative delay in browsing time caused by each of the one or more add-ons using bars of different lengths.

2. The system of claim 1, wherein the notification is non-modal and output via a notification bar that overlays content that is rendered by the web browser in a content rendering area.

3. The system of claim 1, wherein the notification is a pop-up dialog box.

4. The system of claim 1, wherein the add-on advisor is further configured to perform acts comprising:
receiving a selection of one or more of the detected add-ons to be enabled;
enabling the one or more selected add-ons by setting flags associated with the add-ons; and
permitting operation of the one or more add-ons that are enabled.

5. The system of claim 1, wherein the add-on advisor is further configured to perform acts comprising:
receiving a selection of one or more of the detected add-ons to be disabled;
disabling the one or more selected add-ons by setting flags associated with the add-ons; and
preventing operation of the one or more add-ons that are disabled.

6. The system of claim 1, wherein the notification includes a user selectable instrumentality configured to enable or disable the detected add-ons directly via the notification.

7. The system of claim 1, wherein the add-on management dialog provides the options to selectively enable or disable the detected add-ons.

8. The system of claim 1, wherein the add-on management dialog is further configured to present a user selectable instrumentality that is selectable to disable all add-ons collectively.

9. A computer implemented method comprising:
monitoring performance metrics of one or more add-ons for a web browser of a computing device until a defined number of data samples have been obtained, the number of data samples specific to each of the one or more add-ons;
calculating a performance impact of the one or more add-ons based on the data samples;
when the performance impact of the one or more add-ons collectively exceeds a performance threshold associated with loading a web page in the web browser, outputting a notification to inform a user of the performance impact and provide the user with access to options to selectively enable or disable the one or more add-ons to improve performance, wherein the notification includes a user selectable instrumentality that is selectable to expose an add-on management dialog configured to represent relative impact on performance of the one or more add-ons one to another; and
in response to multiple add-ons being displayed in the add-on management dialog, listing the multiple add-ons based on relative performance impact of the multiple add-ons.

10. The computer implemented method of claim 9, wherein monitoring the performance impact of the one or more add-ons for the web browser comprises calculating one or more of load times or navigation times associated with each of the one or more add-ons to determine a delay in browsing caused by the one or more add-ons.

11. The computer implemented method of claim 9, wherein the notification is non-modal and output via a notification bar that overlays content that is rendered by the web browser in a content rendering area.

12. The computer implemented method of claim 9, further comprising:
detecting when add-ons for the web browser are installed;
outputting a new add-on notification to inform the user of the detected add-ons and provide the user with access to options to selectively enable or disable the detected add-ons; and
preventing operation of the detected add-ons prior to action by the user to enable or disable the detected add-ons.

13. The computer implemented method of claim 9, wherein the user selectable instrumentality is further configured to provide the options to selectively enable or disable the one or more add-ons.

14. The computer implemented method of claim 13, wherein:
the performance impact corresponds to a delay in browsing time caused by the one or more add-ons; and
the relative impact on performance of the one or more add-ons is represented in the add-on management dialog using bars of different lengths to show a relative delay in browsing time caused by each of the one or more add-ons.

15. The computer implemented method of claim 13, wherein the relative impact on performance of the one or more add-ons is represented using visual indicators to distinguish add-ons that cause the performance impact to exceed the performance threshold from add-ons that do not cause the performance impact to exceed the performance threshold.

16. The computer implemented method of claim 9, wherein the notification includes one or more user selectable instrumentalities that are selectable to enable the user to view and configure the performance threshold.

17. The computer implemented method of claim 16, wherein the one or more user selectable instrumentalities comprise an input list box that when selected provides a scrollable list of selectable values for the threshold.

18. A computing device comprising computer readable instructions stored thereon that when executed by the computing device implement an add-on advisor that is configured to output an add-on management dialog designed to be used in conjunction with a web browser, wherein the add-on management dialog is configured to:
  display a list of one or more add-ons associated with the web browser responsive to a determination that the one or more add-ons collectively cause an impact on browsing performance that exceeds a configurable threshold set for a delay in browsing time associated with loading a web page in the web browser;
  visually represent to a user of the computing device the relative impact on browsing performance caused by the one or more add-ons one to another using visual indicators to distinguish add-ons that cause the browsing performance to exceed the configurable threshold from add-ons that do not cause the browsing impact to exceed the configurable threshold, impact on browsing performance being visually indicated by one or more performance metrics for the one or more add-ons one to another and represent a relative delay in browsing time caused by each of the one or more add-ons using bars of different lengths; and
  expose one or more user selectable instrumentalities configured to provide options to selectively enable or disable the one or more add-ons displayed in the list.

19. The computing device of claim 18, wherein the add-on advisor is further configured to:
  monitor the one or more performance metrics for the one or more add-ons;
  calculate the impact on browsing performance based on the monitored performance metrics;
  perform the determination that the one or more add-ons cause the impact on browsing performance that exceeds the configurable threshold; and
  output a notification to inform a user of the impact on browsing performance, the notification including a user selectable instrumentality that when selected exposes the add-on management dialog to facilitate management of the one or more add-ons.

20. The computing device of claim 18, wherein the add-on advisor is further configured to:
  permit operation of add-ons that are enabled by user interaction with the options exposed via the add-on management dialog; and
  prevent operation of add-ons that are disabled by user interaction with the options exposed via the add-on management dialog.

* * * * *